May 26, 1925.
R. W. DORN
EMERGENCY TIRE
Filed Aug. 30, 1922
1,539,304
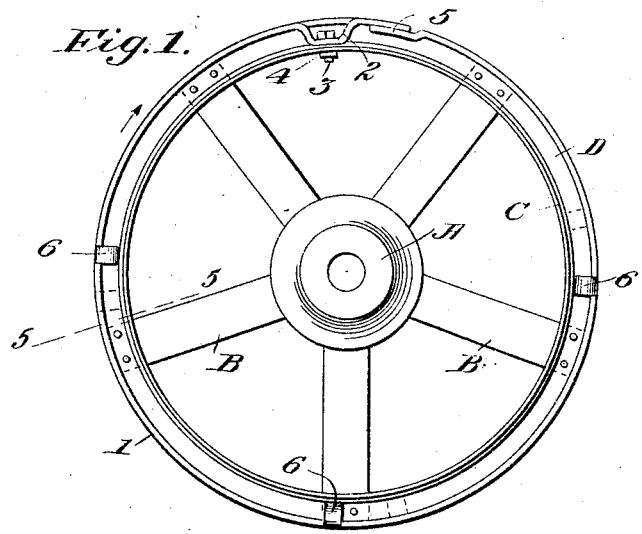
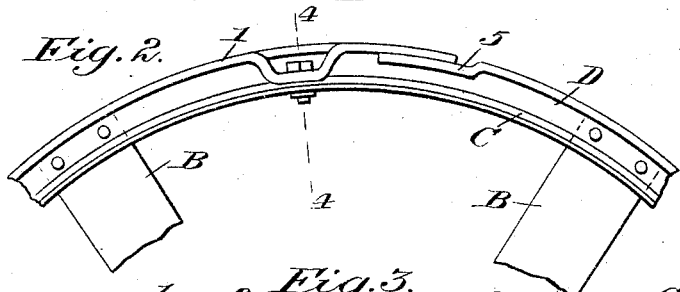
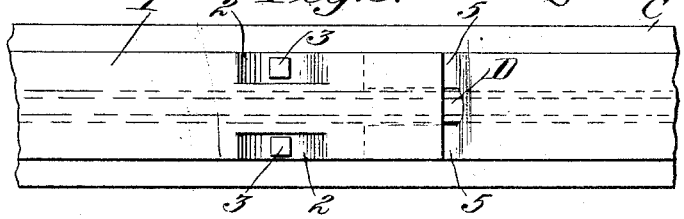
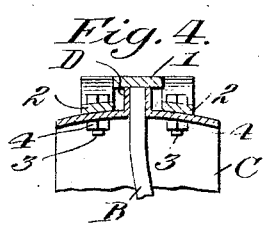 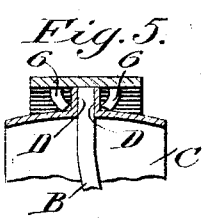
Inventor:
Robert W. Dorn,
by Wm H Babcock & Son
Att'ys.

Patented May 26, 1925.

1,539,304

UNITED STATES PATENT OFFICE.

ROBERT W. DORN, OF LARKINS, FLORIDA.

EMERGENCY TIRE.

Application filed August 30, 1922. Serial No. 585,151.

*To all whom it may concern:*

Be it known that I, ROBERT W. DORN, a citizen of the United States, residing at Larkins, in the county of Dade and State of Florida, have invented certain new and useful Improvements in Emergency Tires, of which the following is a specification.

This invention relates to supplementary or special service tires or tread bands or road bands for use on metal tire wheels having a narrow radially extending peripheral flange, such, for instance, as the front wheels of the Fordson tractor for use with which the present invention is primarily intended.

These Fordson tractors, as well as similar tractors are in very general use now but, because of their tread construction, cannot be run over the highways without cutting them up badly unless their wheel treads be covered over.

It has been found that if a peripheral band be placed on such a wheel tire and fastened to said tire at several points it will result in a certain amount of buckling or puckering of said supplemental tire, which will very promptly, in actual use, shear off the fastening means, besides being a source of rattles and a great deal of trouble to put on and, if it would stay on long enough, equal trouble to remove.

My present invention has for its object to provide a split band fastened to the wheel at only one point peripherally or circumferentially thereof, to so form the band that it may be anchored to the wheel by one end portion closely adjacent the division or split in the band and to so form the other or free end of said band that in arranged relation it will be lapped under the anchored or secured end and will be free to slide back and forth thereunder as the band expands and contracts according to the constantly changing point of contact with the road as the wheel travels thereover, and to so form the band that it cannot move, in a direction transverse of the wheel, out of engagement with the peripheral radially extending flange or rib thereof.

In the accompanying drawings:

Figure 1 is a side elevation of a wheel with a supplemental tire or road band embodying my invention applied thereto and combined therewith;

Figure 2, an enlarged detail side elevation of a segment of said wheel and band, both broken away, said segment being taken on an enlarged scale to show more clearly the construction of, and adjacent to, the ends of said supplemental band;

Figure 3, a top plan view of the segment shown in Figure 2;

Figure 4, a sectional view on line 4—4 of Fig. 2; and

Figure 5, a sectional view on the line 5—5 of Fig. 1.

Referring now in detail to the drawings, A designates the hub of the tractor wheel, B the spokes, C the tread or normally broad load bearing portions of the tire or rim and D the radial peripheral rib or flange into which the spokes B extend and to which they are fastened and on which is to be arranged the supplemental tire or road band 1.

The supplemental tire or road band 1 is provided near its forward end, in the direction of rotation of the wheel, on each side of its peripherally or circumferentially extending central line, with a depressed preferably integral perforated strap 2 formed in any usual and suitable manner, but having both ends of the strap preferably fully connected to the adjacent portions of the supplemental tire or road band 1. Bolts 3 passing through the perforations in said straps 2 respectively, through registering perforations in the portions C respectively of the tire or rim of the wheel and receiving nuts 4 hold or anchor the forward end, in the direction of rotation of the wheel, of supplemental tire or road band 1 to the usual tire of the wheel.

The rear end of the supplemental tire or road band 1 is provided with a radially inwardly offset bifurcated portion forming two tines or prongs 5 receiving between them a portion of the radially extending peripheral flange or rib D and extending under and in engagement with the forward end portion of band 1 and free to move peripherally with respect to the anchored end portion of the band 1 as the latter hugs the wheel tire in contracting and moves slightly radially away therefrom in expanding as the point of contact with the road changes as the wheel travels over the road surface.

At intervals between the ends of the band 1, pairs of positioning lugs 6 are bent radially inwardly toward the rib D, the lugs 6 of each pair being spaced apart peripherally, or arranged in staggered relation, so as not to weaken the band too much at any one point.

The straps 2, prongs 5 and lugs 6 are all so located transversely of the band 1 as to so position the latter, when in arranged relation on the tractor wheel, that its central peripheral line will register in a radial direction with the corresponding line of rib D against which it bears in use.

From the foregoing it will be seen that the supplemental tire or road band 1 will always be maintained in proper position transversely of the wheel and that it can wrap itself freely around the wheel peripherally thereof, being anchored thereto at one point only of its periphery, so that there will be no appreciable shearing action upon the bolts 3 which secure or anchor it at said single point of its periphery to said wheel.

Having thus described my invention, what I claim as new and desire to secure by Letters Patent is:

1. A supplemental tire or road band for a metal tired wheel having an outer surface transversely irregular, said supplemental tire consisting of a split ring having one end anchored to the wheel tire and having its other end lapping said anchored end and left free for normal sliding operative movement circumferentially of the wheel as the point of contact of said band with the ground progressively changes as the wheel rotates, all portions of said band intermediate the said end portions being left free to move circumferentially and radially.

2. A supplemental tire or road band for a metal tired wheel having an outer surface transversely irregular, said supplemental tire consisting of a split ring having its ends arranged in overlapping relation, in arranged relation on the wheel, and having its radially outer and anchored end portion, in arranged relation, rigidly connected to the tire of said wheel by suitable means and its radially inner end free to slide circumferentially under said anchored end portion and bifurcated to receive between its bifurcations a portion of the tire of said wheel, all portions of said supplemental tire intervening between said end portions being free to move circumferentially and radially of the wheel.

3. A supplemental tire or road band for a metal tire wheel having an outer surface transversely irregular, said supplemental tire consisting of a split ring having its ends arranged in overlapping relation, in arranged relation on the wheel, and having its radially outer anchored end portion, in arranged relation, positively connected to the tire of said wheel and its radially inner end free to slide circumferentially under said anchored end portion, said ring being provided with radially inwardly presented pairs of lugs arranged at intervals, the lugs of each pair being adapted to engage the opposite sides of a circumferential radially extending projection to maintain said band in correct position transversely of the wheel.

4. A metal tired wheel having a circumferential flange extending radially from the remainder of its tread face, the tire of said wheel being provided at one point with a perforation, in combination with a split ring fitting around and on the radially outer face of said flange, provided with a perforation adjacent its radially outer anchored end and registering with the perforation in said wheel tire, and a bolt passing through said perforations to anchor said end portion of said split ring to said wheel tire, the said ring having its other, and free, end portion fitting under said anchored end portion and held thereby against spreading radially away from the wheel while being left free to slide back and forth thereunder in a circumferential direction as the wheel rotates, all portions of said ring intermediate said end portions being left free to move circumferentially and radially of the wheel.

5. A metal tired wheel having a circumferential flange extending radially from the remainder of its tread face, the tire of said wheel being provided at one point with a perforation, in combination with a split ring fitting around and on the radially outer face of said flange, having intermediate its end portions means for retaining it in correct position transversely of the wheel, and provided with a perforation adjacent its radially outer anchored end portion and registering with the perforation in said wheel tire, and a bolt passing through said perforations to anchor said end portion of said split ring to said wheel tire, the said ring having its other, and free, end portion fitting under said anchored end portion and held thereby against spreading radially away from the wheel while being left free to slide back and forth in a circumferential direction, all portions of said ring intermediate said end portions being left free to move circumferentially and radially of the wheel.

6. A metal tired wheel having a circumferential flange extending radially therefrom, in combination with a split ring and means for anchoring one end portion thereof rigidly to said wheel tire, said ring having its other, and free end, radially inwardly offset and lapped under said anchored end portion and bifurcated to receive between its bifurcations a portion of said peripheral flange, said free end being free to slide circumferentially of the wheel with relation to said anchored end portion, and all portion of said ring intermediate said end portions being free to move circumferentially and radially of the wheel.

ROBERT W. DORN.